United States Patent
Knaggs et al.

(10) Patent No.: US 9,419,474 B2
(45) Date of Patent: Aug. 16, 2016

(54) VOLTAGE CONTROL USING FIELD-EFFECT TRANSISTORS

(71) Applicant: Telect Inc., Liberty Lake, WA (US)

(72) Inventors: David Knaggs, Spokane, WA (US); Larry O'Neal Reeder, Rockwall, TX (US)

(73) Assignee: Telect, Inc., Liberty Lake, WA (US)

( * ) Notice: Subject to any disclaimer, the term of this patent is extended or adjusted under 35 U.S.C. 154(b) by 961 days.

(21) Appl. No.: 13/664,193

(22) Filed: Oct. 30, 2012

(65) Prior Publication Data

US 2014/0117941 A1    May 1, 2014

(51) Int. Cl.
*H02J 9/06* (2006.01)

(52) U.S. Cl.
CPC ...................................... *H02J 9/061* (2013.01)

(58) Field of Classification Search
CPC .......... H02J 7/34; H02J 9/061; H03K 17/005; H03K 17/693
See application file for complete search history.

(56) References Cited

U.S. PATENT DOCUMENTS

| | | | | |
|---|---|---|---|---|
| 4,730,121 A * | 3/1988 | Lee | ........................ | H02J 9/061 307/64 |
| 5,315,549 A * | 5/1994 | Scherpenberg | ......... | G11C 5/141 365/189.09 |
| 5,703,415 A * | 12/1997 | Tanaka | .................... | G11C 5/141 307/66 |
| 5,886,561 A * | 3/1999 | Eitan | ....................... | H02J 9/061 307/64 |
| 6,639,329 B2 * | 10/2003 | Chan | ........................ | H02J 1/102 307/29 |
| 6,822,346 B2 * | 11/2004 | Floro | ...................... | G11C 5/141 307/66 |
| 7,800,433 B2 * | 9/2010 | Yoshikawa | ..... | H03K 19/017545 327/530 |

* cited by examiner

*Primary Examiner* — Jeffrey Zweizig
(74) *Attorney, Agent, or Firm* — Lee & Hayes, PLLC

(57) ABSTRACT

Described herein are techniques and architectures for gradually transitioning from voltage supplied by a primary power source to voltage supplied by a secondary power source. In particular implementations, a voltage control circuit is used to transition voltage across a load to be supplied by the secondary power source. The voltage control circuit may include a first circuit and a second circuit connected in parallel. The first circuit may include the primary power source connect to the load, while the second circuit may include the secondary power source connected to one or more field-effect transistors. The one or more field-effect transistors may be controlled to cause current of the secondary power source to be gradually transferred to the load. This may result in a transfer of the voltage across the load to be supplied by the secondary power source.

21 Claims, 7 Drawing Sheets

VOLTAGE CONTROL USING FIELD-EFFECT TRANSISTORS

BACKGROUND

Many systems use secondary power sources to maintain power when an event occurs, such as a power outage. For example, in a telecommunication environment equipment may be connected to backup batteries in the event that a primary power source is inoperable. These systems often switch to a secondary power source in an abrupt manner through a switch (e.g., contactor), which causes an instantaneous change in voltage to the system. Due to a difference in voltage levels of the secondary and primary power sources, the instantaneous change causes unwanted effects, such as voltage spikes and arcing, often damaging or resetting the system.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Overview

Figure 1:
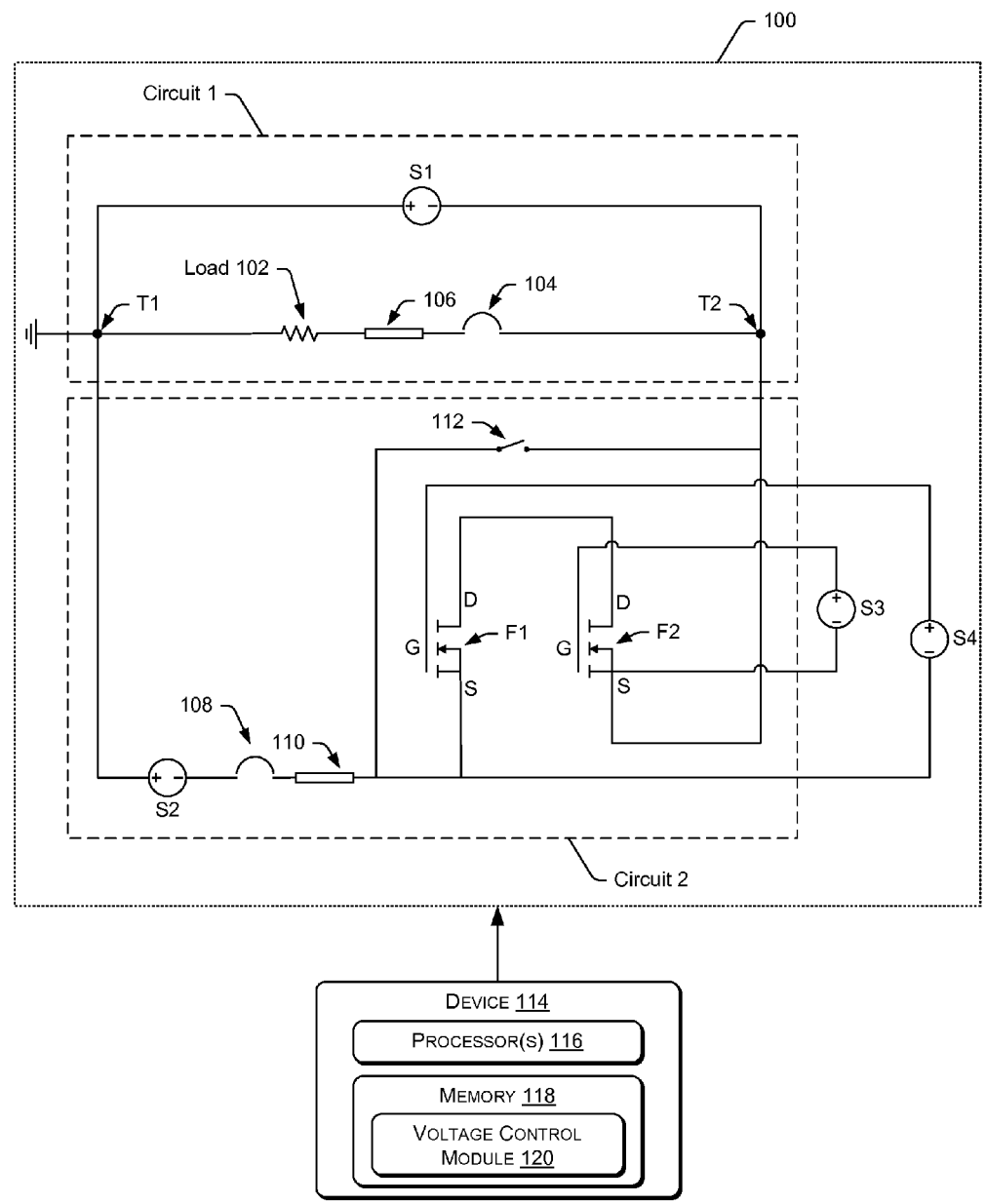
FIG. 1 illustrates an example voltage control circuit for gradually transitioning from voltage supplied by a primary power source to voltage supplied by a secondary power source.

As discussed above, many systems utilize secondary power sources to maintain power. These systems often switch from a primary power source to a secondary power source through a switch, which causes an instantaneous change in voltage on the system. Because of a difference in voltage levels between the secondary and primary power sources, the instantaneous change in voltage often causes unwanted effects, such as voltage spikes and arcing, which may damage or reset the system.

This disclosure describes techniques and architectures for gradually transitioning from voltage supplied by a primary power source to voltage supplied by a secondary power source. In some examples, the transition to the secondary power source may occur after an event occurs (e.g., a drop in voltage of the primary power source) and while the primary power source maintains some level of voltage. For example, in response to a power outage, a system may initially switch to a primary backup battery (e.g., primary power source). Thereafter, when a voltage of the primary backup battery falls below a particular threshold, the system may switch to a secondary backup battery (e.g., secondary power source) to maintain voltage at a particular level (e.g., a higher voltage level than a voltage level of the primary power source). In some instances, by transitioning in a gradual manner, voltage of the secondary power source may be transferred to a load while avoiding unwanted effects, such as voltage spikes and arcing.

In particular implementations, a voltage control circuit is used to transition voltage across a load to be supplied by the secondary power source. The voltage control circuit may include a first circuit and a second circuit connected in parallel. The first circuit may include the primary power source connect to the load to provide an initial voltage to the load. The second circuit may include the secondary power source connected to one or more field-effect transistors (FETs). The FETs may be connected to each other through the drain terminals of the FETs in order to isolate the first and second circuits from each other regardless of the relative voltage polarities of the first and second circuits.

In some instances, the voltage control circuit may include a voltage control element to control voltage applied to the FETs, thereby adjusting an amount of current supplied to the load by the secondary power source. The adjustment of current to the load may affect an amount of voltage applied to the load by the secondary power source. For instance, in an initial state in which the primary power source is used, the FETs may be controlled so that no current is supplied to the load from the secondary power source. When the secondary power source is needed (e.g., a voltage level of the primary power source drops below a threshold, a planned power outage is implemented, etc.), the FETs may be controlled to cause current of the secondary power source to be gradually transferred to the load. This may result in a transfer of the voltage across the load to be supplied by the secondary power source.

In one example described herein, the primary and secondary power sources each comprise one or more batteries. For instance, the primary power source may comprise a first type of battery configured to provide power (e.g., power above a threshold) over a short period of time (e.g., lithium ion battery), while the second power source may comprise a second type of battery configured to provide power (e.g., power above the threshold) over a long period of time (e.g., lead acid battery). As such, the primary and secondary power sources may provide two levels of backup power. However, it should be appreciated that the primary and secondary power sources may comprise other types of power sources, such as powerline, capacitive, fuel cell, generator, alternator, rectifier, solar power, wind, thermal, tidal, and so on. Further, the primary and secondary power sources may comprise the same or different types of sources. Moreover, the primary and secondary power sources may comprise Direct Current (DC) sources and/or Alternating Current (AC) sources. Additionally, or alternatively, the primary and secondary power sources may each comprise a battery that is configured to provide voltage within a particular range, such as a range associated with telecommunication equipment (e.g., 40-60 VDC).

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Voltage Control Circuits

FIG. 1 illustrates an example voltage control circuit 100 in which techniques described herein may be implemented. The circuit 100 includes a first circuit ("circuit 1") and a second circuit ("circuit 2") connected in parallel at terminals ("terminal T1" and "terminal T2"). The circuit 1 includes a primary power source ("source S1") connected to the terminals T1 and T2 (e.g., main terminals). As illustrated, a first terminal of the source S1 (e.g., positive terminal) is connected to a first end of a load 102 and a second terminal of the source S1 (e.g., negative terminal) is connected to a second end of the load through a circuit protection element 104 and a connection point element 106. The first terminal of the source S1 may be grounded, as illustrated. The load 102 may comprise any type of device configured to receive power, such as equipment or other devices. For example, the load 102 may comprise equipment configured to provide functionality at a cellular site (e.g., cellular tower). Such equipment may include, for example, transmitters, receivers, digital signal processors, control electronics, and so on.

The circuit 2 includes a secondary power source ("source S2") connected to the terminal T1 along a conductive line (e.g., wire) and connected to a first field-effect transistor (FET) ("FET F1") along another conductive line. The source S2 may be connected in series to the FET F1. As illustrated, a first terminal of the source S2 (e.g., positive terminal) is connected to the terminal T1 and a second terminal of the source S2 (e.g., negative terminal) is connected to a source terminal of the FET F1. The source S2 is connected to the FET F1 through a circuit protection element 108 and a connection point element 110. The FET F1 is connected in series to a second FET ("FET F2"). Here, a drain terminal of the FET F1 is connected to a drain terminal of the FET F2. This may isolate the circuit 1 from the circuit 2 regardless of the relative voltage polarities of the circuits 1 and 2. For example, the FET F2 may be controlled to act as a "blocking" FET that blocks current flow if the source S1 (e.g., −54V) is more negative than the source S2 (e.g., −52V). Although the voltage control circuit 100 of FIG. 1 includes the FET F2, in some instances the circuit 100 may include a single FET (e.g., FET F1), for example, when the voltage source S1 will always remain more positive than the voltage source S2 or if allowing reverse current flow is desired, such as if the source S2 is a battery and the source S1 is a rectifier in which case the source S2 could be charged by the source S1.

The FETs discussed herein may comprise any type of FET, such as a Metal-oxide-Semiconductor Field-Effect transistor (MOSFET), Junction Gate Field-Effect transistor (JFET), and so on. The FETs may comprise n-channels or p-channels. In some instances, the FETs comprise high-powered FETs configured to allow current flow greater than 100 Amps and voltages up to 75 or 100 V with relatively low resistances. Further, in some instances a FET may be connected to a heat sink or other device to dissipate heat. The FETs may generally control the flow of current from source-to-drain of the FET.

The circuit protection element 104 and/or 108 may comprise a circuit breaker, fuse, or other type of protection element to disconnect a conductive circuit. Meanwhile, the connection point element 106 and/or 110 may provide a connection point for one or multiple loads to connect to the circuit 1. The connection point element 106 and/or 110 may include a bus bar, wire including connection points, and so on.

The circuit 2 includes a switch 112 configured to be operated in a closed or open state. The closed state may provide a conductive path between the source S2 and the terminal T2, which ultimately connects to the load 102. While the open state may break the conductive path between the source S2 and the terminal T2. The switch 112 may be remotely operated and/or may switch in response to occurrence of an event, such as in response to determining that voltage across the load 102 has transitioned from being applied by the source S1 to being applied by the source S2. The switch 112 may comprise a contactor, a relay, or another type of switch. In some instances, an air gap of a contactor may be larger than an air gap of the relay. In one example, a relay may be used for the switch 112 in order to reduce costs associated with making the voltage control circuit 100 (e.g., a relay may be relatively less expensive to purchase than a contactor).

The circuit 2 may be associated with and/or include voltage control elements ("control element S3" and "control element S4"). As illustrated, the control element S4 is connected to a gate terminal of the FET F1 for supplying voltage to the FET F1 and is connected to the source terminal of the FET F1 for reference. Meanwhile, the control element S3 is connected to a gate terminal of the FET F2 for supplying voltage to the FET F2 and is connected to the source of the FET F2 for reference. The control element S3 and/or S4 may be implemented as one or more power sources that provide DC and/or AC power. Further, the control element S3 and/or S4 may be implemented as a processor (e.g., microprocessor controller), discrete circuitry, a manual operator (e.g., user), or otherwise. Although the control elements S3 and S4 are illustrated as discrete and separate elements, the elements S3 and S4 may be implemented as single element (e.g., single unit).

The control elements S3 and S4 may control voltage applied to the FETs F1 and F2 to control an amount of current flowing through the FETs F1 and F2. For example, the FET F2 may be controlled to conduct with substantially zero resistance in a source-to-drain path. Further, the FET F1 may be controlled in the FET's linear region to gradually transfer current to the load 102, as discussed in further detail below.

In the example voltage control circuit 100 of FIG. 1, and in other examples described herein, the sources S1 and S2 are described as including negative voltages (e.g., −48 VDC). As such, the positive side refers to the side at a "lower" voltage potential and is connected to ground, while the negative side refers to the side at a "higher" voltage potential. This may be common in some environments, such as in environments housing telecommunication equipment (e.g., which include negative voltages around −50 VDC). However, it should be appreciated that these techniques may similarly apply to instances where the sources S1 and S2 include positive voltages. In these instances, the sources S1 and S2 may be flipped such that a positive terminal of a source is connected to a location where a negative terminal had been connected. In such instances, the function of the FETs F1 and F2 may be switched such that the FET F1 may act as the "blocking" FET that blocks current flow and the FET F2 may act as the "control" FET. Further, in some instances the source S1 and/or the source S2 may be implemented by a plurality of sources. For example, the source S1 may include multiple batteries connected in series or parallel.

In some instances, the voltage control circuit 100 is associated with and/or includes a device 114. The device 114 may comprise a computer (e.g., laptop), server, control device, a microprocessor controller, digital signal processor, integrated circuit chip, and so on. In some instances, the sources S3 and/or S4 are implemented by and/or integral with the device 114. The device 114 may include one or more processors 116 and memory 118.

The memory 118 may include software functionality configured as one or more "modules." However, the modules are intended to represent example divisions of the software for purposes of discussion, and are not intended to represent any type of requirement or required method, manner or necessary organization. Accordingly, while various "modules" are discussed, their functionality and/or similar functionality could be arranged differently (e.g., broken into a larger number of modules, etc.). As illustrated in FIG. 1, the memory 118 includes a voltage control module 120 to control the circuit to transition from the source S1 to the source S2. For example, the module 120 may control the FETs F1 and F2 to cause current from the source S2 to load 102 to gradually increase. The module 120 may also control the switch 112 to open and close.

In one example, the voltage control circuit 100 of FIG. 1 is used to manage different types of backup power sources (e.g., an in environment that provides power to telecommunication equipment). In this example, the primary power source S1 comprises an initial backup battery (e.g., lithium ion battery) that provides power for relatively short periods of time (e.g., during short power outages). The secondary power source S2 comprises an additional backup battery (e.g., lead acid battery) that provides power for relatively long periods of time (e.g., during long power outages). When the primary power source S1 has been used for a period of time and the voltage of the primary power source drops below a particular threshold (e.g., 48 V), the voltage control circuit 100 may gradually transition over to the secondary power source S2, which may have a relatively higher voltage level (e.g., 54 V) than the primary power source S1 at that time. In some instances, by enabling the different types of power sources to be utilized, different characteristics of the batteries may be leveraged, such as different charge cycle algorithms, costs, lifetimes, limitations, and so on.

Although the example circuit 100 in FIG. 1 is illustrated as including different elements, any one or multiple elements may be removed. In one example, the circuit 100 does not include the circuit protection elements 104 and 108 and/or the connection point elements 106 and 110. Further, in another example, when a polarity of the sources S1 and S2 is known and remains the same, the circuit 100 may include a single FET (e.g., FET F1).

Figure 2:
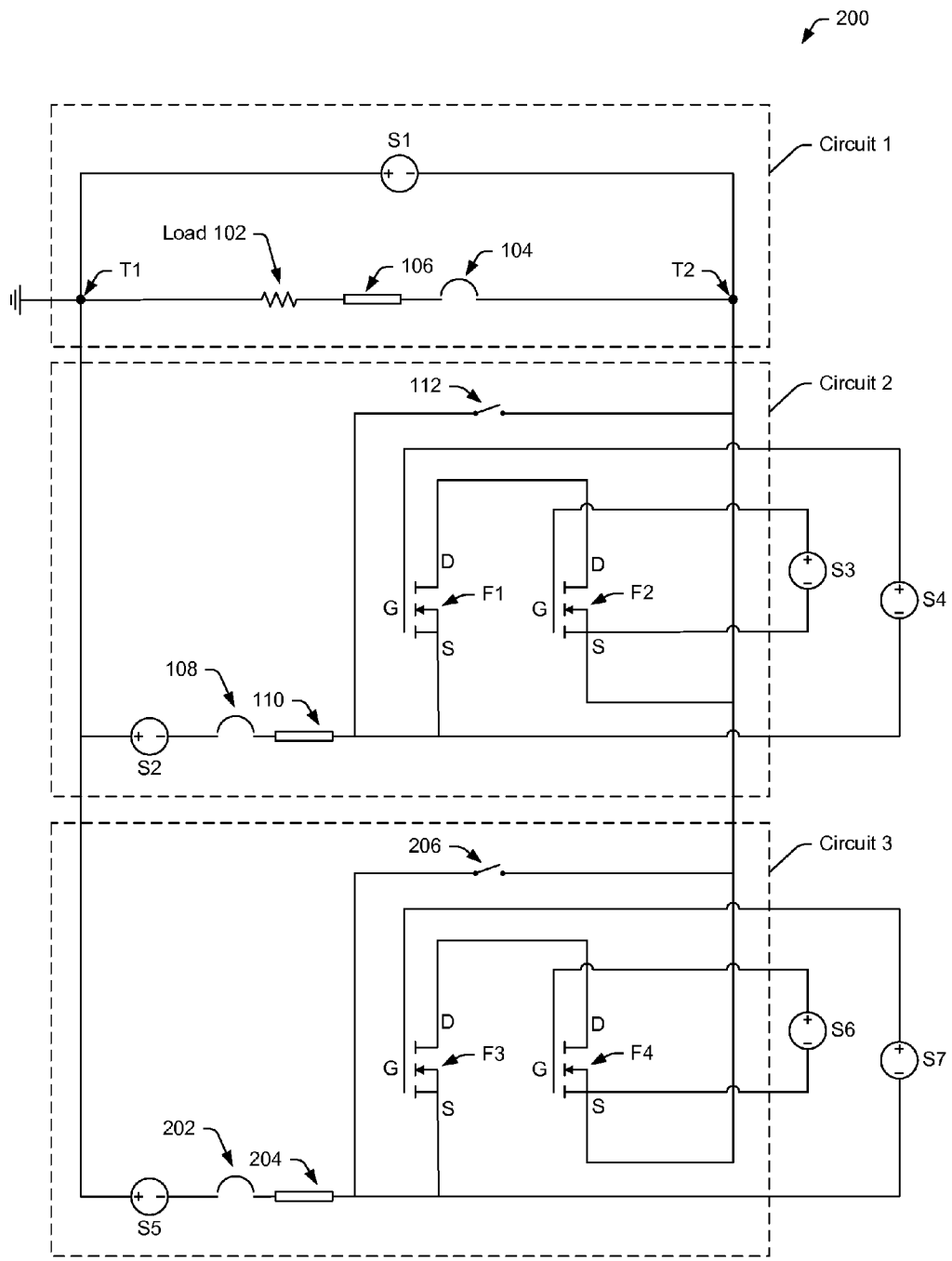
FIG. 2 illustrates an example voltage control circuit that includes a tertiary power source connected in parallel to the voltage control circuit of FIG. 1.

FIG. 2 illustrates an example voltage control circuit 200 that includes the circuits 1 and 2 from FIG. 1 and an additional circuit ("circuit 3"). The circuit 3 may be connected in parallel to the circuit 1 and 2. The circuit 3 includes a tertiary power source ("source S5") connected to the terminal T1 along a conductive line (e.g., wire) and connected to a FET F3 along another conductive line. As illustrated, a first terminal of the source S5 (e.g., positive terminal) is connected to the terminal T1 and a second terminal of the source S5 (e.g., negative terminal) is connected to a source terminal of the FET F3. The source S5 is connected to the FET F1 through a circuit protection element 202 and a connection point element 204. A drain terminal of the FET F3 is connected to a drain terminal of a FET F4. The circuit 3 also includes a switch 206 configured to be operated in a closed or open state similar to the switch 112 of the circuit 2.

The circuit 3 may be associated with and/or include voltage control elements ("control element S6" and "control element S7"). As illustrated, the control element S7 is connected to a gate terminal of the FET F3 for supplying voltage to the FET F3 and is connected to the source terminal of the FET F3 for reference. Meanwhile, the control element S6 is connected to a gate terminal of the FET F4 for supplying voltage to the FET F4 and is connected to the source of the FET F4 for reference. The control element S6 and/or S7 may be implemented as one or more power sources that provide DC and/or AC power. Further, the control element S6 and/or S7 may be implemented as a processor (e.g., microprocessor), discrete circuitry, a manual operator (e.g., user), or otherwise. Although the control elements S6 and S7 are illustrated as discrete and separate elements, the elements S6 and S7 may be implemented as single element (e.g., single unit). Moreover, in some instances the control elements S6 and S7 may be implemented as a single element with one or more of the control elements S3 and S4.

In some instances, the example voltage control circuit 200 of FIG. 2 allows multiple power sources to be connected to the load 102 for transitioning to any of the power sources. This may be useful in instances where multiple power sources are available, such as batteries, generators, solar power, and so on.

Example Operation of a Voltage Control Circuit

FIGS. 3A-3E illustrate an example operation of the voltage control circuit 100 of FIG. 1 as the circuit 100 transitions from the primary power source S1 to the secondary power source S2. In particular, FIGS. 3A-3E illustrate current and voltage of the circuit 100 during various times as the circuit 100 switches from utilizing the primary power source S1 to the secondary power source S2. In this example, the circuit 100 begins to transition from the primary power source S1 to the secondary power source S2 in response to detecting that the voltage supplied by the primary power source S1 has dropped below a particular voltage threshold (e.g., 48 VDC). In this example, the circuit 100 switches to the secondary power source S2 which has a larger voltage level than the primary power source S1. However, these techniques may similarly apply to instances where the primary power source S1 has a larger or equal voltage level.

Figure 3A:
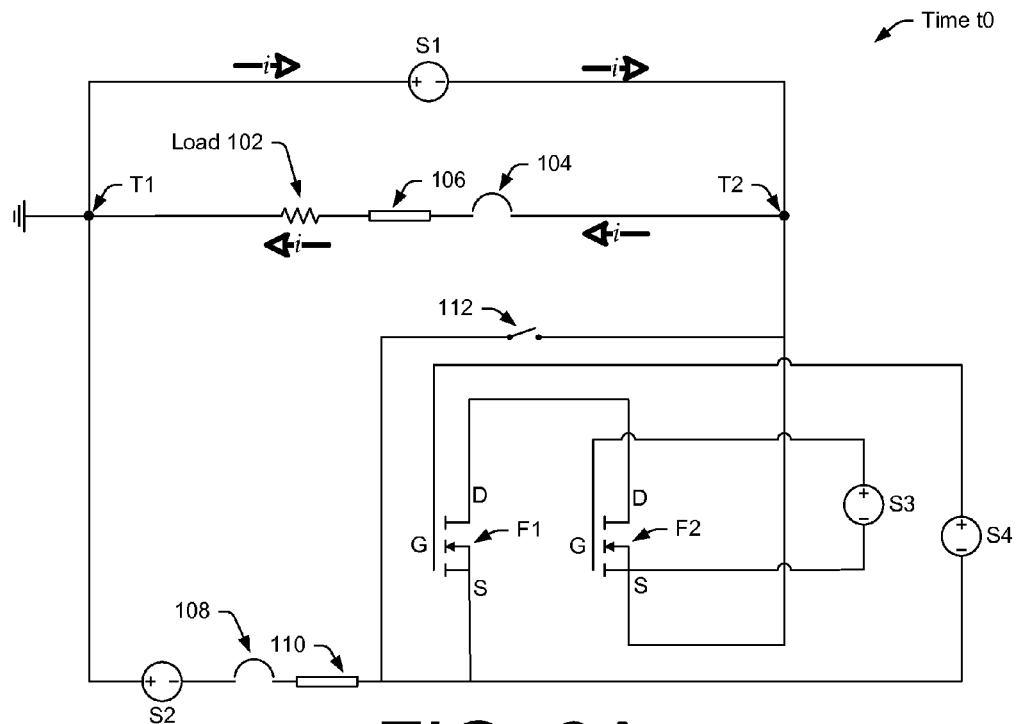
FIGS. 3A-3E illustrate an example operation of the voltage control circuit of FIG. 1 as the circuit transitions from a primary power source to a secondary power source.

FIG. 3A illustrates the circuit 100 at time t0 when voltage across the load 102 is supplied by the source S1. As illustrated in FIG. 3A, the current flowing through the load 102 is generated by the voltage from the source S1. That is, all current flowing through the load 102 is from the source S1. In addition, at time t0 the FET F2 is controlled so that the source-to-drain path and the drain-to-source path of the FET F2 allows current to flow freely with substantially no resistance. In one example, a voltage is applied to the FET F2 at time t0 (e.g., as it is desired to switch to the source S2) to cause the current to flow freely in either direction. In one instance, the FET F2 is controlled by applying an optimal conductance voltage to the gate of the FET F2. The optimal conductance voltage enables the FET F2 to conduct with substantially zero resistance. In some instances, the optimal conductance voltage is obtained from manufacture specifications associated with the FET. As noted above, in some instances the FET F2 acts as a blocking FET to block for reverse polarity.

Further, at time t0 the FET F1 is maintained in a state in which current does not flow through the FET F1 along a source-to-drain path of the FET F1. In one instance, the FET F1 is controlled by refraining from applying a voltage to the gate of the FET F1. Here, the FET F1 may be said to have "infinite" resistance so that current does not flow through the FET F1.

At or around time t0, the circuit 100 or a device associated with the circuit 100 may determine to switch from the source S1 to the source S2. As noted above, in this example the switching begins in response to detecting that the voltage supplied by the source S1 has dropped below a particular voltage threshold (e.g., 48 VDC). However, the switching may begin in response to other determinations or events, such as a request by a user or device to begin the switch.

When it is determined to switch, the circuit 100 or associated device may determine a time period over which the transition to the source S2 will occur. The amount of current supplied by the source S2 will be increased gradually over this time period. By transitioning over the time period, the circuit 100 may gradually transition from utilizing the source S1 to utilizing the source S2. In some instance, the time period may be determined based on a difference between a voltage supplied by the source S1 at time t0 and a voltage supplied by the source S2 at time t0. In these instances, the time period may increase in time as the difference in voltage increases. Alternatively, or additionally, the time period may be determined based on a difference between current flowing through the load 102 at time t0 due to voltage supplied the source S1 and a current (e.g., estimated) that would flow through the load 102 if the voltage of the secondary source S2 were to be applied. Similarly, in this instance the time period may increase in time as the difference in current increases. Accordingly, the time period may generally be long when there is a large difference in current and/or voltage between the source 1 and source 2, and the time period may generally be short when there is a small difference in current and/or voltage.

Figure 3B:
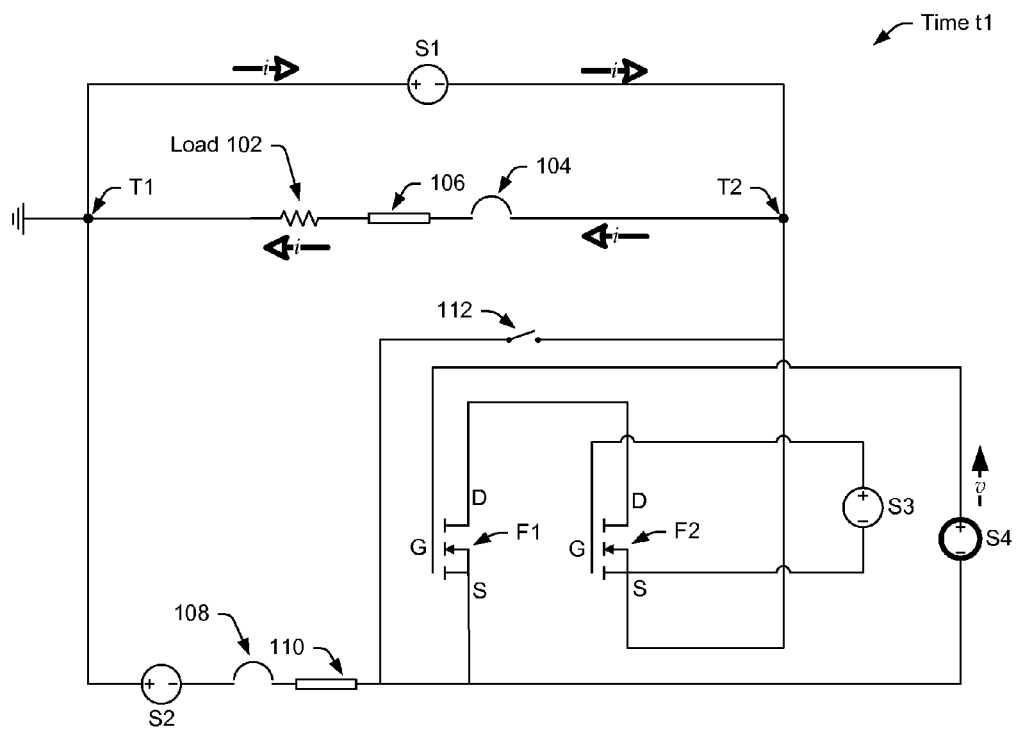

FIG. 3B illustrates the circuit 100 at time t1 when voltage supplied by the control element S4 to the FET F1 has been increased to an initial activation voltage associated with the FET F1. The initial activation voltage may comprise a voltage at which the FET F1 begins to conduct along a source-to-drain path. That is, a voltage at which current may begin to flow along the source-to-drain path of the FET F1. In some instance, the initial activation voltage is obtained from manufacture specifications associated with the FET F1.

Figure 3C:
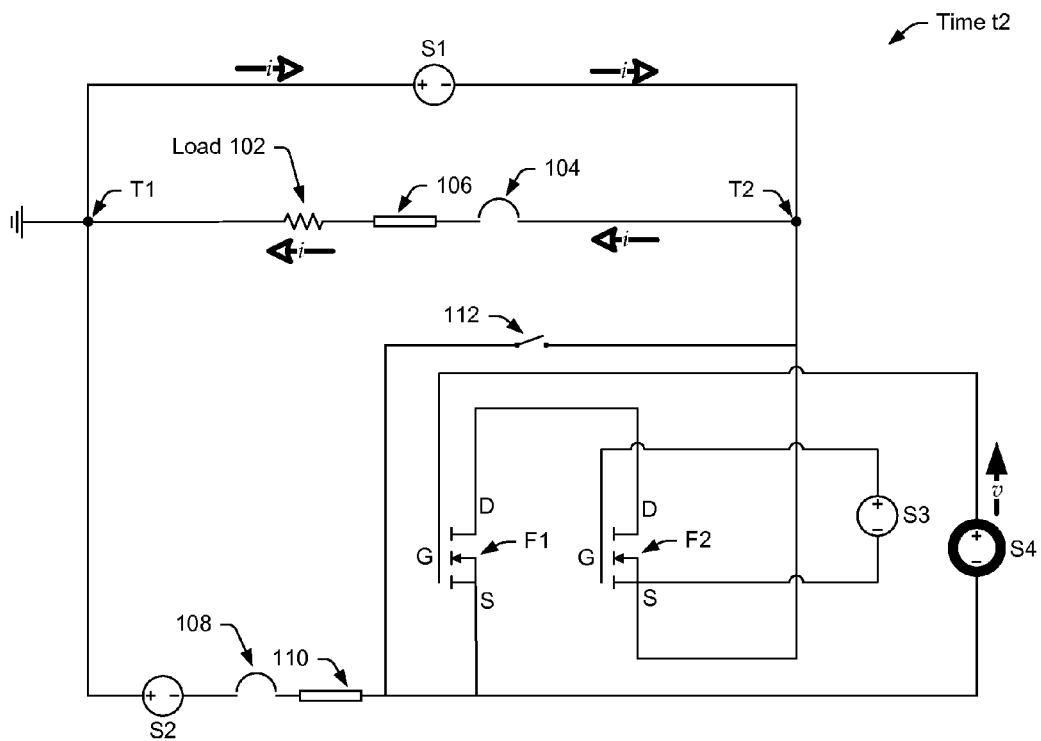

FIG. 3C illustrates the circuit 100 at time t2 when voltage supplied by the control element S4 to the FET F1 has been increased from the initial activation voltage to an optimal transition voltage for the FET F1. The optimal transition voltage may comprise a voltage that causes current to more freely flow through the FET F1 to the load 102, in comparison to the initial transition voltage (e.g., a relatively small yet measureable amount of current). That is, by applying the optimal transition voltage, resistance of the FET F1 may drop causing more current to flow through the FET F1 along a source-to-drain path. The optimal transition voltage is determined based on a difference in voltage or current of the source S1 and source S2 and based on manufacture specifications associated with the FET F1. For example, when the difference in voltage or current is large, the optimal transition voltage may comprise a low voltage to cause current from the source S2 to slowly transfer to the load 102. Further, when the difference in voltage or current is small the optimal transition voltage may comprise a high voltage to cause current from the source S2 to more quickly transfer to the load 102. In some instances, the control element S4 incrementally or continuously increases the voltage applied to the FET F1 within a range of optimal transition voltages. This may further aid in transitioning to the source S2 in a gradual manner.

Figure 3D:
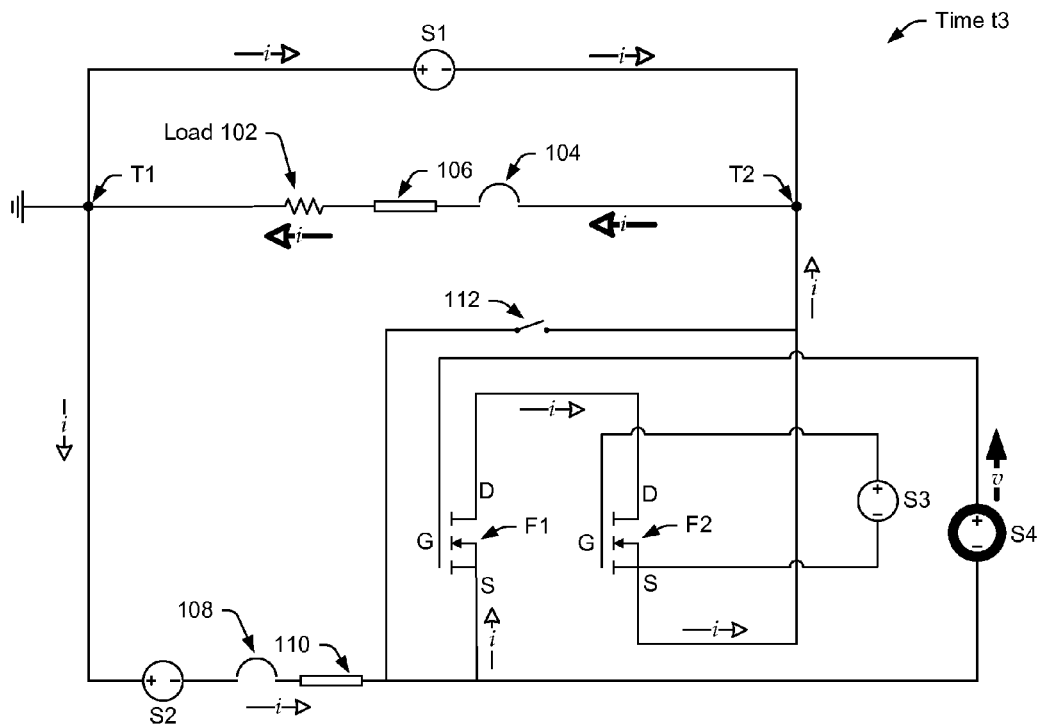

FIG. 3D illustrates the circuit 100 at time t3 when the current flowing through the load 102 is shared by the sources S1 and S2. That is, some current flows from the source S2 through the FETs F1 and F2 to the load and some current flows from the source S1 to the load 102. Although current is shared, the voltage across the load 102 is maintained at a voltage level of the source S1 until after all current flowing through the load 102 is supplied by the source S2, as discussed in further detail below.

Figure 3E:
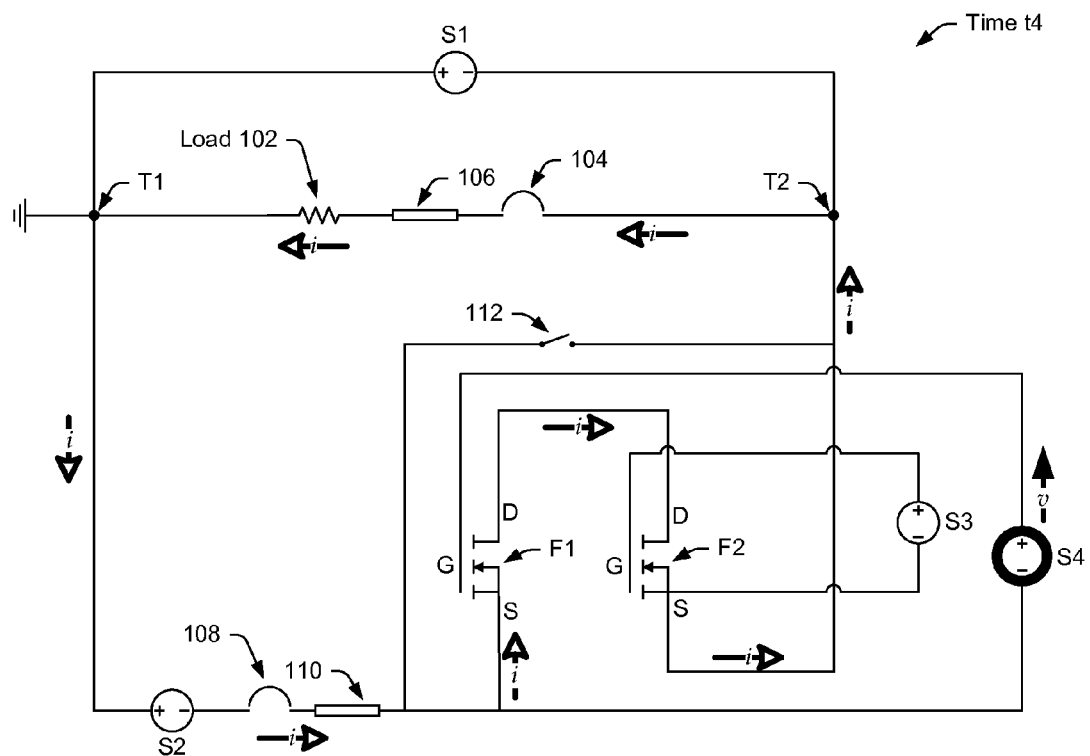

FIG. 3E illustrates the circuit 100 at time t4 when the current flowing through the load 102 is all due to the source S2. That is, the current flowing through the load 102 is no longer shared with the source S1, but comes solely from the source S2 (e.g., through the FETs F1 and F2). In addition, at time t4 the voltage across the load 102 begins to rise from the voltage level of the source S1 until it reaches the voltage level of the source S2, which in this example is larger than the voltage level of the source S1.

After the voltage across the load 102 reaches the voltage of the source S2, the voltage applied to the FET F1 may be increased from the optimal transition voltage to an optimal conductance voltage for the FET F1. This may allow current to flow through the FET F1 with near zero resistance and reduce power dissipation of the FET F1. In some instances, the switch 112 may additionally, or alternatively, be switched to a closed state providing an alternative path for current to flow from the source S2 to the load 102. This alternative path may have relatively less resistance than the path through the FET F1. Accordingly, in instances where the switch 112 is closed, the FET F1 and/or F2 may be controlled so that no current flows through the FET F1 and/or F2. This may reduce energy loss associated with current flow through the FET F1 and/or F2.

Further, after the voltage across the load 102 reaches the voltage of the source S2, in some instances the source S1 may be turned off and/or removed from the circuit 1. The source S1 may be removed by disconnecting from the terminals T1 and T2. This may allow the source S1 to be changed, recharged, and so on, which may be particularly advantageous when the source S1 is a battery or other removable or serviceable power source.

Example Graph of Transitioning Voltage

Figure 4:
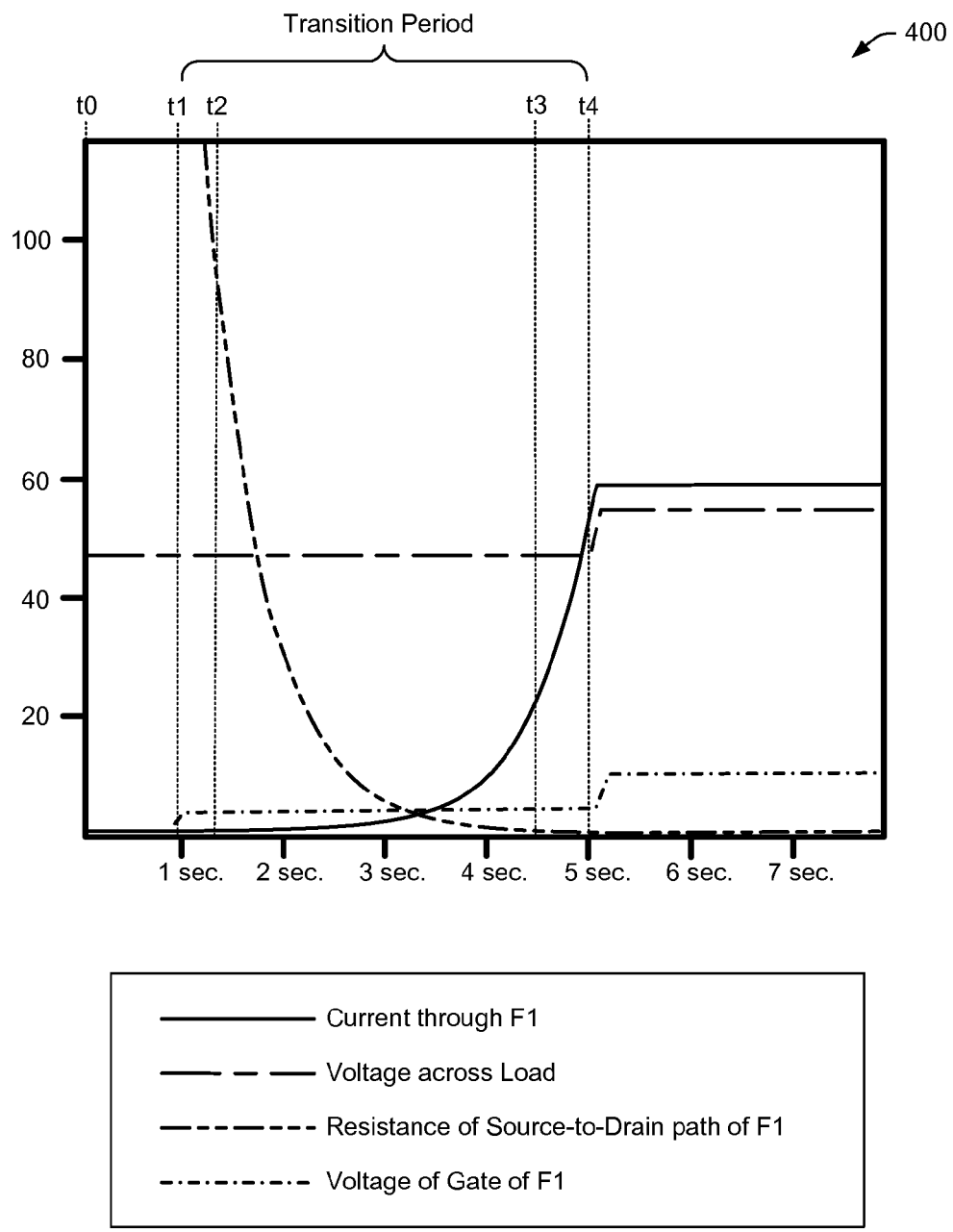
FIG. 4 illustrates an example graph showing voltage, current, and resistance of various elements of the voltage control circuit of FIG. 1 as voltage is transitioned from a primary power source to a secondary power source.

FIG. 4 illustrates an example graph 400 showing voltage, current, and/or resistance of various elements of the circuit 100 as voltage is transitioned from the primary power source S1 to the secondary power source S2. In particular, the graph 400 shows current flowing through the FET F1, voltage across the load 102, resistance of the source-to-drain path of FET F1, and voltage applied to the gate of FET F1. In the graph 400, the y-axis corresponds to current, voltage, and resistance, while the x-axis corresponds to time in seconds.

The top edge of the graph 400 indicates times t0-t4 corresponding to the times t0-t4 discussed above with respect to FIGS. 3A-3E. In the example graph 400, the time t0 corresponds to 0 seconds, the time t1 corresponds to 1 second, the time t2 corresponds to 1.4 seconds, the time t3 corresponds to 4.5 seconds, and the time t4 corresponds to 5 seconds. As discussed above, at time t0 the voltage across the load 102 is supplied by the source S1. At time t1, the voltage supplied to the gate of the FET F1 has been increased to the initial activation voltage for the FET F1. In the example graph 400, this initial activation voltage is 3V. Further, at time t2, the voltage supplied to the gate of the FET F1 has been increased to the optimal transition voltage for the FET F1. In the example of graph 400, this optimal transition voltage is 5V. At time t3, the current flowing through the load 102 is shared by the source S1 and source S2. Finally, at time t4, the current flowing through the load 102 is all supplied by the source S2.

As also illustrated in FIG. 4, at time t4 the voltage across the load 102 begins to rise from the voltage level of the source S1 to the voltage level of the source S2, as illustrated in the graph 400 by the ramp in voltage of the load 102 immediately after the time t4. While the voltage is rising, the current through the FET F1 continues to rise until the voltage across the load 102 plateaus (e.g., levels to a constant level). The voltage may plateau to the source S2 voltage or to a voltage substantially close to the source S2 voltage that accounts for voltage drops over other components of the circuit 100. After the voltage across the load 102 plateaus, the voltage applied to the gate of the FET F1 may be increased to the optimal conductance voltage for the FET F1, as illustrated in the graph 400 by the ramp in voltage applied to the gate of FET F1 after time t4. In the example graph 400, this optimal conductance voltage is 10V.

In some instances, the time period between t1-t4 may correspond to a period of time during which voltage is transitioned from the source S1 to the source S2. This period of time may be adjusted and/or determined based on characteristics of the circuit 100, such as a difference in voltage and/or current between the source S1 and source S2, as discussed above.

Example Process

Figure 5:
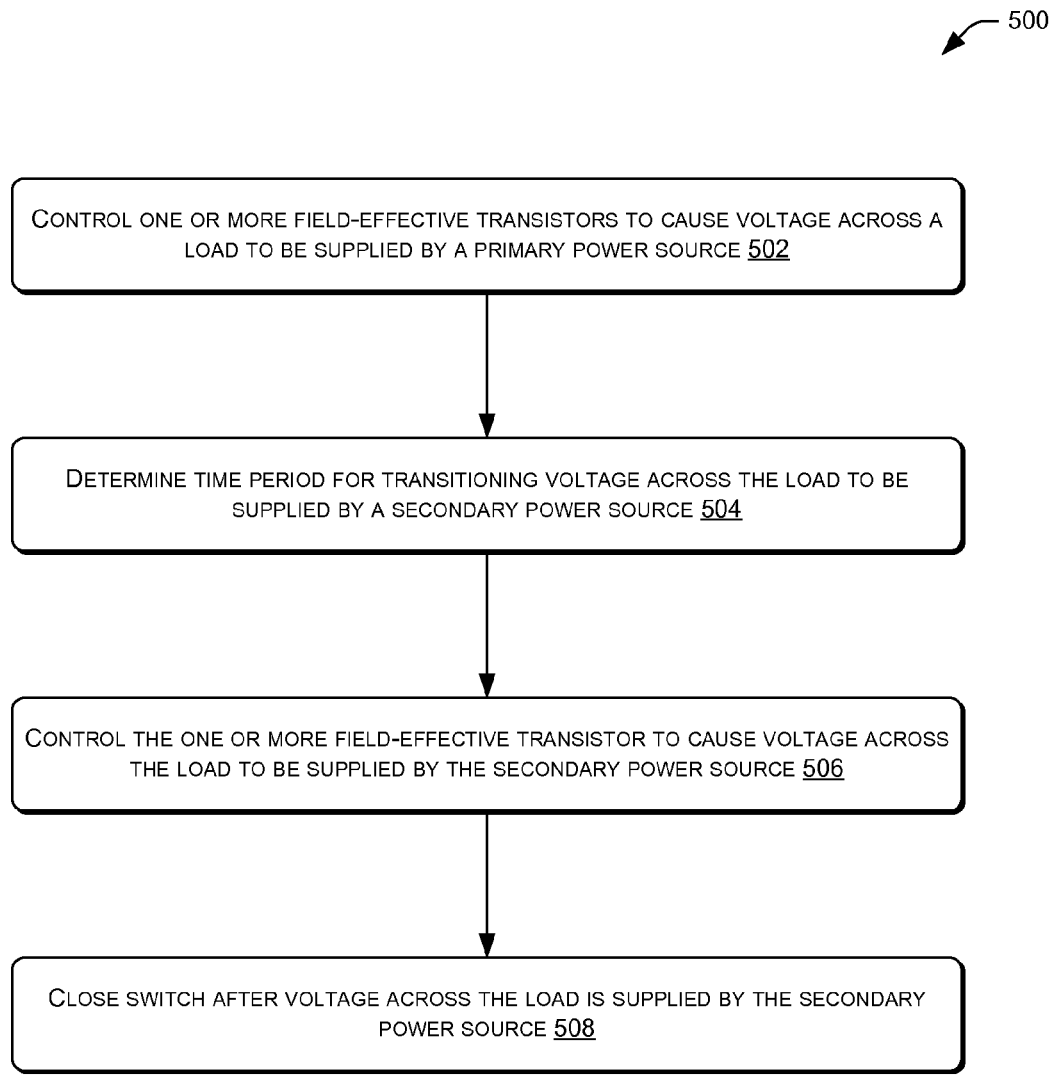
FIG. 5 illustrates an example process for gradually transitioning from a primary power source to a secondary power source.

FIG. 5 illustrates an example process 500 for gradually transitioning from a primary power source to a secondary power source. For ease of illustration the process 500 is described as being performed in the voltage control circuit 100 of FIG. 1. For example, one or more of the individual operations of the process 500 may be performed by the circuit 1 and/or circuit 2 (e.g., the voltage control element S3 and/or S4). However, the process 500 may be performed in other circuits or devices associated with the circuit 100, and the circuit 100 may be used to perform other processes.

The process 500 (as well as each process described herein) is illustrated as a logical flow graph, each operation of which represents a sequence of operations that can be implemented in hardware, software, or a combination thereof. In the context of software, the operations represent computer-executable instructions stored on memory that, when executed by one or more processors, perform the recited operations. In the context of hardware, the operations may represent logic configured for operation within one or more devices (e.g., application specific integrated circuits (ASICs), gate arrays and/or programmable logic devices. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process.

The memory described herein may comprise one or more computer-readable media and may take the form of volatile memory, such as random access memory (RAM) and/or non-volatile memory, such as read only memory (ROM) or flash RAM. Computer-readable media includes volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer-readable media does not include communication media, such as modulated data signals and carrier waves. As such, the computer-readable media may include non-transitory media.

In FIG. 5, at 502, the control element S3 and/or S4 may control the FET F1 and/or F2 to cause voltage across the load 102 to be supplied from the primary power source S1. For example, the FETs F1 and F2 may be control to block current in a path from the source S2 to the terminal T2.

At 504, the control element S3 and/or S4 or a device associated with the circuit 100 may determine a time period for transitioning the voltage across the load 102 to be supplied by the secondary power source S2. The determination at 504 may be based at least in part on (i) a difference between a voltage supplied by the primary power source S1 and a voltage supplied by the secondary power source S2, and/or (ii) a difference between current flowing through the load 102 due to the voltage supplied primary power source S1 and current that would flow through the load if the second voltage supplied by the secondary power source S2 were to be supplied to the load 102. For example, a longer period of time may be determined when the difference in voltage and/or the difference in current is greater than a threshold, and a shorter period of time may be determined when the difference in voltage and/or the difference in current is less than the threshold.

At 506, the control element S3 and/or S4 may control the FET F1 and/or F2 to cause the voltage across the load 102 to be supplied by the secondary power source S2. For example, the control element S3 and/or S4 may control the FET F1 and/or F2 to cause an amount of current flowing through the FETs F1 and F2 to the load to be increased gradually over the determined time period.

At 508, the circuit 100 may close the switch 112 after the voltage across the load is supplied by the secondary power source S2. The switch 112 may be located along a conductive line that is located between the secondary power source S2 and the load 102. By closing the switch 112, current previously flowing through the FETs F1 and F2 may flow through the conductive line of the switch 112.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A voltage control circuit for transitioning from a first power source to a second power source, the voltage control circuit comprising:
   a first main terminal configured to connect to a load, a first terminal of the first power source, and a first terminal of the second power source, the second power source comprising a battery;
   a first field-effect transistor (FET) configured to connect to a second terminal of the second power source;
   a second FET connected in series to the first FET;
   a second main terminal configured to connect to the load, a second terminal of the first power source, and the second FET; and
   one or more voltage control elements connected to the first FET and the second FET, the one or more voltage control elements being configured to control the first and/or second FET to cause voltage across the load to transition from being supplied by the first power source to being supplied by the second power source, the controlling including causing an amount of current flowing through the first FET to the load to be increased over a time period that is based on at least one of:
- a difference between a voltage supplied by the first power source and a voltage supplied by the second power source; or
- a difference between current flowing through the load due to the voltage supplied by the first power source and current that would flow through the load due to the voltage supplied by the second power source.

2. The voltage control circuit of claim 1, wherein the time period is longer in time for larger voltage differences.

3. The voltage control circuit of claim 1, wherein the time period is longer in time for larger current differences.

4. The voltage control circuit of claim 1, further comprising:
- a relay configured to connect to the second terminal of the second power source and to the second main terminal, the relay being switched to a closed state after the voltage across the load is transitioned from being supplied by the first power source to being supplied by the second power source.

5. The voltage control circuit of claim 1, further comprising:
- a contactor configured to connect to the second terminal of the second power source and to the second main terminal, the contactor being switched to a closed state after the voltage across the load is transitioned from being supplied by the first power source to being supplied by the second power source.

6. The voltage control circuit of claim 1, wherein:
- the first power source comprises a first type of battery configured to provide power over a first duration; and
- the second power source comprises a second type of battery configured to provide power over a second duration which is longer than the first duration.

7. The voltage control circuit of claim 1, wherein the one or more voltage control elements are configured to cause the voltage across the load to transition from being supplied by the first power source to being supplied by the second power source at least partly in response to a voltage of the first power source falling below a predetermined threshold.

8. A voltage control circuit comprising:
- a first conductive line configured to connect to a load, a first terminal of a first power source, and a first terminal of a second power source;
- a second conductive line configured to connect to a second terminal of the second power source at a first end of the second conductive line;
- a field-effect transistor (FET) connected to a second end of the second conductive line, the FET causing voltage across the load to transition from being supplied by the first power source to being supplied by the second power source by increasing an amount of current flowing through the FET to the load;
- a third conductive line connected to the FET and configured to connect to the load and a second terminal of the first power source; and
- a switch connected to the second conductive line and the third conductive line, the switch being switched to a closed state after the voltage across the load is transitioned from being supplied by the first power source to being supplied by the second power source.

9. The voltage control circuit of claim 8, further comprising:
- one or more voltage control elements connected to the FET, the one or more voltage control elements to cause the voltage across the load to transition from being supplied by the first power source to being supplied by the second power source by increasing the amount of current flowing through the FET to the load, the amount of current being increased gradually over a time period.

10. The voltage control circuit of claim 9, wherein the time period is based at least in part on:
- a difference between a voltage supplied by the first power source and a voltage supplied by the second power source, the time period being longer in time for larger voltage differences; and/or
- a difference between current flowing through the load due to the voltage supplied by the first power source and current that would flow through the load due to the voltage supplied by the second power source, the time period being longer in time for larger current differences.

11. The voltage control circuit of claim 8, wherein the switch comprises a relay and/or a contactor.

12. The voltage control circuit of claim 8, further comprising:
- another FET located along the third conductive line, the other FET being connected to the FET and being configured to connect to the load and the second terminal of the first power source.

13. The voltage control circuit of claim 12, wherein the other FET comprises a blocking FET that blocks for reverse polarity.

14. The voltage control circuit of claim 8, further comprising:
- a circuit protection element located along the second conductive line between the second power source and the FET, the circuit protection element to disconnect a conductive circuit between the second power source and the FET.

15. The voltage control circuit of claim 8, further comprising:
- a third power source connected to the first conductive line and another FET; and
- the other FET connected to the third power source and the third conductive line, the other FET causing voltage across the load to transition from being supplied by the second power source to being supplied by the third power source.

16. The voltage control circuit of claim 8, further comprising:
- the first power source and the second power source, the first power source and the second power source each comprising a battery configured to provide voltage within a particular range that is associated with telecommunication equipment.

17. A method comprising:
- controlling one or more field-effect transistors (FETs) to cause voltage across a load to be supplied by a first power source, the load being part of a first circuit that is connected in parallel to a second circuit that includes the FETs;
- determining a time period for transitioning the voltage across the load to be supplied by a second power source that is part of the second circuit, the determining being based at least in part on:

a difference between a voltage supplied by the first power source and a voltage supplied by the second power source; and/or a difference between current flowing through the load due to the voltage supplied by the first power source and current that would flow through the load due to the voltage supplied by the second power source; and controlling the one or more FETs to cause the voltage across the load to be supplied by the second power source, the controlling comprising causing an amount of current flowing through the one or more FETs to the load to be increased gradually over the determined time period.

18. The method of claim 17, further comprising:

after the voltage across the load is supplied by the second power source, closing a switch located along a conductive line connected to the second power source and the load, the closed switch causing current previously flowing through the one or more FETs to flow through the conductive line.

19. The method of claim 17, wherein the determining comprises:

determining a first period of time when the difference in voltage and/or the difference in current is greater than a threshold; and determining a second period of time that is shorter than the first period of time when the difference in voltage and/or the difference in current is less than the threshold.

20. A voltage control circuit comprising:

a first conductive line configured to connect to a load, a first terminal of a first power source, and a first terminal of a second power source;

a second conductive line configured to connect to a second terminal of the second power source at a first end of the second conductive line;

a field-effect transistor (FET) connected to a second end of the second conductive line, the FET causing voltage across the load to transition from being supplied by the first power source to being supplied by the second power source by increasing an amount of current flowing through the FET to the load;

a third conductive line connected to the FET and configured to connect to the load and a second terminal of the first power source; and a circuit protection element located along the second conductive line between the second power source and the FET, the circuit protection element to disconnect a conductive circuit between the second power source and the FET.

21. A voltage control circuit comprising:

a first conductive line configured to connect to a load, a first terminal of a first power source, and a first terminal of a second power source, the first power source and the second power source each comprising a battery configured to provide voltage within a particular range that is associated with telecommunication equipment;

a second conductive line configured to connect to a second terminal of the second power source at a first end of the second conductive line;

a field-effect transistor (FET) connected to a second end of the second conductive line, the FET causing voltage across the load to transition from being supplied by the first power source to being supplied by the second power source by increasing an amount of current flowing through the FET to the load; and a third conductive line connected to the FET and configured to connect to the load and a second terminal of the first power source.

* * * * *